March 11, 1947. O. C. BLOMGREN 2,417,044
MICROSCOPE
Filed May 3, 1945
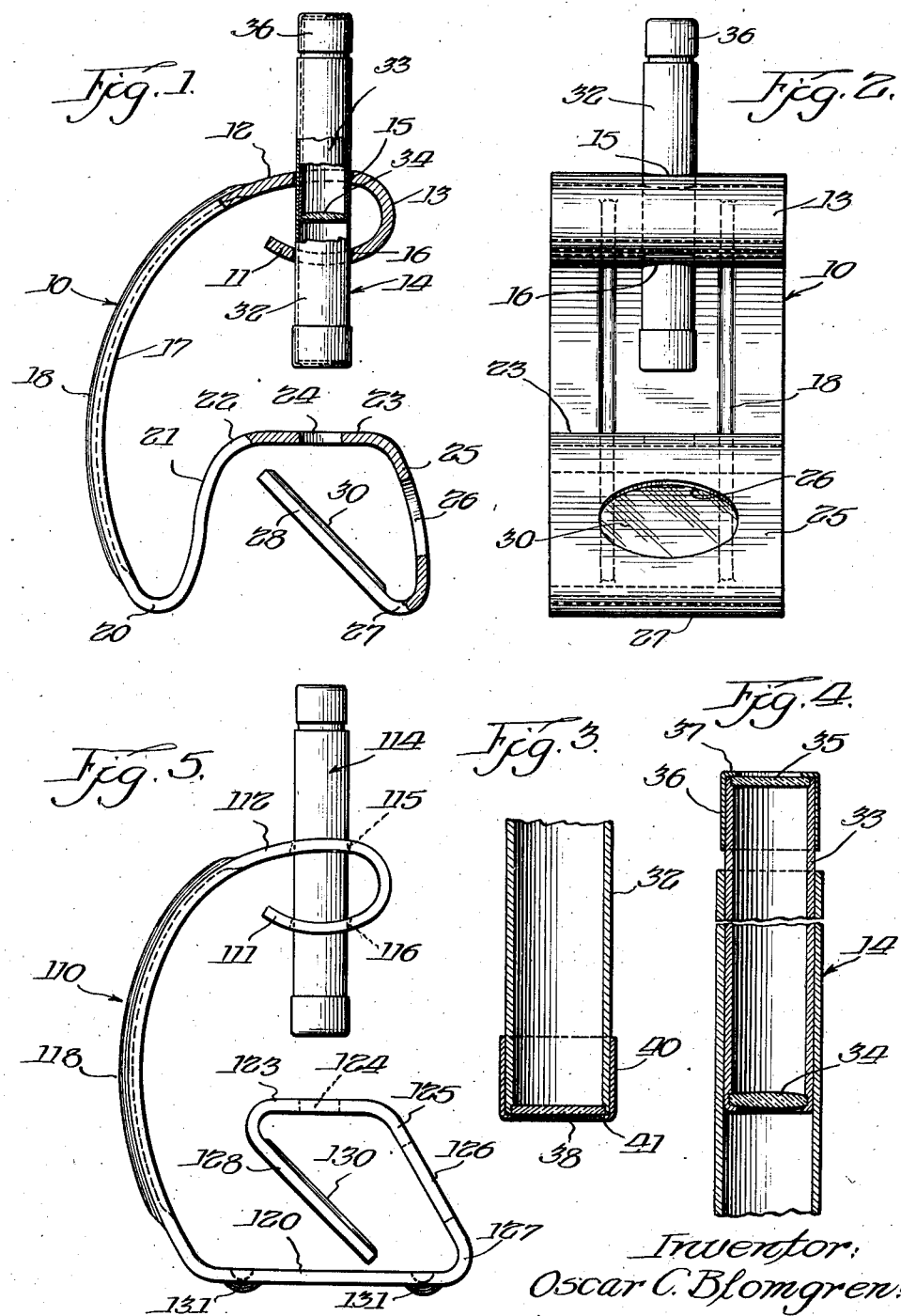
Inventor:
Oscar C. Blomgren Patented Mar. 11, 1947

2,417,044

UNITED STATES PATENT OFFICE 2,417,044

MICROSCOPE

Oscar C. Blomgren, Evanston, Ill.

Application May 3, 1945, Serial No. 591,649

5 Claims. (Cl. 88—39)

1

The invention relates to microscopes and has more particular reference to an improved microscope of the toy variety which will be simple in construction, having very few parts and which can be cheaply manufactured.

The device of the invention is distinguished from the precision type of scientific instrument by its simple construction and low cost, although its ability in magnifying small objects is well above standard for similar articles in the same price class, and thus as a simple microscope it has many uses where the exacting precision and high magnification of the more expensive instrument is not required.

An object of the invention is to provide a microscope having a one-piece frame that can be easily bent into the desired shape with only a few simple bending operations being required.

Another object is to provide a scientific instrument of the type described that can be cheaply manufactured, which will have general utility, and one wherein the frame will provide an adjustable support for both the magnifying tube and the mirror.

A more specific object resides in the provision of a microscope having a one-piece frame and wherein the extremities of the frame provide novel means for adjustably supporting the magnifying tube and mirror respectively.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1 is a side elevational view of a microscope forming the subject matter of the invention, parts being shown in section;

Figure 2 is a front elevational view of the microscope of Figure 1;

Figure 3 is a fragmentary sectional view of the lower end of the magnifying tube;

Figure 4 is a fragmentary sectional view of the upper end of the magnifying tube showing the telescoping relation of the inner tube therewith; and Figure 5 is a side elevational view of a modified form of microscope coming within the invention.

Referring to Figure 1 of the drawings, the frame 10 of the microscope is formed from a single piece of metal, plastic, wood or the like, and which

2 may be bent or cast into the shape as shown. When the frame 10 is bent from a single strip of metal only a few bending operations of the simplest kind are required to form the loop at the upper end and the base and mirror support at the lower end.

The upper terminal end of the frame is bent upon itself to form the free lip portion 11 and which is spaced a suitable distance below the top portion 12, the said portions being joined by the curved section 13 which is disposed to the front of the frame. Aligned openings are provided in the top and lip portion, respectively, for receiving the magnifying tube indicated in its entirety by numeral 14. The tube is thus received in opening 15 in the top portion 12 and opening 16 in the lip portion 11. The magnifying tube is resiliently held by this upper terminal end of the frame since the lip portion 11 is displaced to a slight extent by the insertion of the tube. This displacement of the lip portion yieldingly applies sufficient tension to the tube to hold the same in place, permitting, however, adjustability of the tube in a vertical direction.

The frame 10 includes the curved back portion 17 which is provided with one or more ribs 18 for reinforcing and strengthening this vertical section of the frame. The lower end of this curved back portion is bent upon itself forming the arcuate section 20 and the rear standard 21. The frame is then bent horizontally, forming the curved section 22 and the horizontal table 23 for supporting the specimens to be observed. For the purpose of illuminating the specimens the table is provided with the opening 24.

The front standard 25 of the frame is formed by bending the frame downwardly and to a slight extent outwardly of the horizontal table 23. An elliptical opening 26 is located in this front standard. By bending the lower terminal end of the frame rearwardly and upwardly the arcuate section 27 and the reflector supporting portion 28 are formed. A reflector 30 is suitably secured to said last mentioned portion. The frame is suitably supported by the arcuate sections 20 and 27 which form the legs of the frame and it will be observed that since the lower terminal end of the frame supports the reflector, the same is adjustable for properly directing the light received through opening 26 in an upward direction through opening 24 in the horizontal table.

The magnifying tube essentially consists of an outer supporting tube 32 and an inner telescoping tube 33. The inner tube 33 has telescoping relation with the upper end of said outer tube and said inner tube is provided with the magnifying lens 34. The eye piece 35 is fitted to the inner tube at the upper end of the same, being suitably held in place by the outer cover 36 which is beaded over the eye piece as at 37. In a similar manner the outer tube 32 carries the object glass 38 at its lower end. The glass is held in position by cover 40 which is beaded over the glass as at 41.

As previously described, the magnifying tube is adjustably held by the upper terminal end of the frame. It is relatively easy to adjust the tube vertically of this portion of the frame and as a result the operator is able to secure the proper positioning of the magnifying tube with respect to the horizontal table on which the specimens are placed. The inner tube 33 containing the magnifying lens 34 can be adjusted vertically for proper magnification of the specimen. The mirror 30 should be supported at an angle of approximately 45 degrees so as to direct the light rays from the elliptical opening 26 in an upward direction through opening 24. However, limited adjustment of this terminal end 28 is of course possible so that maximum efficiency can be obtained in the illumination of the specimen to be observed.

In Figure 5 a modified form of microscope coming within the invention is disclosed. The upper terminal end of the frame 110 is constructed in all respects similar to that shown in Figure 1. Said end is bent upon itself to form the free lip portion 111 which is spaced a suitable distance below the top portion 112. Openings 115 and 116 are formed in the portions respectively for adjustably retaining the magnifying tube indicated in its entirety by 114. One or more reinforcing and strengthening ribs 118 are provided in the curved back portion of the frame and the base portion 120 is formed by a suitable bend in the frame at the base of said back portion. Said base portion 120 extends forwardly to the arcuate section 127 formed by bending the frame upwardly and inwardly and to provide the front standard 125 containing the light opening 126. The horizontal table 123 is located directly under the magnifying tube and as described in connection with Figure 1 said table section is provided with the opening 124. The lower terminal end of the frame 128 is bent downwardly and forwardly to form the supporting portion for reflector 130. Instead of resting the frame of the microscope on the flat base portion 120 it is preferred that projections 131 be struck therefrom as shown in Figure 5. Four projections are formed, one at each corner, and as a result of the projections a steady support for the microscope is provided.

The several improved features of the present microscope are embodied in both forms shown in Figures 1 and 5. It is essential that the magnifying tube have adjustability toward and from the specimen supporting table. This adjustability is provided for in the present device by the loop in the upper end of the frame. Just the right tension is applied to the magnifying tube at all times to fixedly hold the same in any desired position. The opposite terminal end of the frame is likewise adjustable to a limited extent so that the mirror may be properly positioned for insuring full illumination of the specimen when in supported relation on the horizontal table. When the frame is made of a translucent or a transparent plastic the opening 24 or 124 in the table can be omitted and it may even be possible to omit the mirror since the specimen would be adequately illuminated without this element.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a microscope, the combination with a magnifying tube containing a magnifying lens, of a one-piece frame providing a top loop for adjustably supporting the said magnifying tube with the optical axis thereof being substantially vertically disposed, said frame also providing a horizontal table section located below the magnifying tube and in alignment therewith, said table section and top loop being connected by a curved portion of the frame and which is reinforced by longitudinally extending ribs, and a mirror supported by the lower terminal end of the frame and disposed below said horizontal table section.

2. In a microscope, the combination with a magnifying tube containing a magnifying lens, of a one-piece frame bent into shape to provide a resilient top loop for receiving and adjustably supporting the said magnifying tube with the optical axis thereof being substantially vertically disposed, said frame also providing a horizontal table section located below the magnifying tube for supporting specimens to be viewed, said table section and top loop being connected by a curved portion of the frame and which is reinforced by longitudinally extending ribs, and a mirror supported by the lower terminal end of the frame and disposed below said horizontal table section.

3. In a microscope, the combination with a magnifying tube containing a magnifying lens, of a one-piece frame bent into shape to provide a resilient top loop for receiving and adjustably supporting the said magnifying tube with the optical axis thereof being substantially vertically disposed, said top loop being formed by bending the upper terminal end under the top portion of the frame to provide a loop portion, said frame also providing a horizontal table section located below the magnifying tube for supporting specimens to be viewed, a mirror supported by the lower terminal end of the frame and disposed below said horizontal table section, and said table section having an opening therein in substantial alignment with the magnifying tube and said mirror.

4. In a microscope, the combination with a magnifying tube containing a magnifying lens, of a one-piece frame adjustably supporting the tube and providing a horizontal table section for supporting the specimens to be viewed, said frame having the upper terminal end thereof bent upon the frame to form spaced portions comprising a loop and which portions are provided with openings for receiving the magnifying tube, said table section and loop being connected by a curved portion of the frame and which is reinforced by longitudinally extending ribs, and the lower terminal end of the frame providing a mirror support and having location under the said horizontal table section, and a mirror fixed to said mirror supporting portion of the frame.

5. In a microscope, the combination with a magnifying tube containing a magnifying lens, of a one-piece frame for supporting said tube and for also supporting the specimens to be viewed, the upper terminal end of said frame being bent downwardly and under the top portion of the frame to form a loop and which is provided with openings for receiving and adjustably supporting the magnifying tube with its optical axis disposed approximately vertically, the intermediate section of the frame being bent to provide a horizontal table having location below and in substantial alignment with the magnifying tube, said table section and loop being connected by a curved portion of the frame and which curved portion in advance of its connection with the table section provides a supporting leg for supporting the frame, the lower terminal end of the frame forming a mirror support having location below the horizontal table section, and the connecting portion of the frame between said table section and mirror support providing another leg for supporting the frame.

OSCAR C. BLOMGREN.

REFERENCES CITED

The following references are of record in the file of this patent:

UNITED STATES PATENTS

| Number | Name | Date |
| --- | --- | --- |
| 998,616 | Jewell | July 25, 1911 |
| 1,007,424 | Bjorklund | Oct. 31, 1911 |
| 2,110,653 | Powell | Mar. 8, 1938 |

FOREIGN PATENTS

| Number | Country | Date |
| --- | --- | --- |
| 200,777 | British | July 19, 1923 |